US009325248B2

(12) United States Patent
Lindemann et al.

(10) Patent No.: US 9,325,248 B2
(45) Date of Patent: Apr. 26, 2016

(54) CONVERTER WITH SHARED CURRENT PATH AND ISOLATION BARRIER

(71) Applicant: PR Electronics A/S, Rønde (DK)

(72) Inventors: Stig Alnøe Lindemann, Højbjerg (DK); Dan Vinge Madsen, Risskov (DK)

(73) Assignee: PR Electronics A/S, Rønde (DK)

( * ) Notice: Subject to any disclaimer, the term of this patent is extended or adjusted under 35 U.S.C. 154(b) by 0 days.

(21) Appl. No.: 14/413,853

(22) PCT Filed: Jun. 27, 2013

(86) PCT No.: PCT/DK2013/050214
§ 371 (c)(1),
(2) Date: Jan. 9, 2015

(87) PCT Pub. No.: WO2014/008898
PCT Pub. Date: Jan. 16, 2014

(65) Prior Publication Data
US 2015/0200600 A1   Jul. 16, 2015

(30) Foreign Application Priority Data

Jul. 10, 2012   (DK) .................................. 2012 70420

(51) Int. Cl.
*H02M 3/335* (2006.01)
*H02M 7/08* (2006.01)
*H02M 1/10* (2006.01)

(52) U.S. Cl.
CPC ............ *H02M 3/33546* (2013.01); *H02M 1/10* (2013.01); *H02M 3/33561* (2013.01)

(58) Field of Classification Search
USPC .................................... 363/24–26, 67, 69, 70
See application file for complete search history.

(56) References Cited

U.S. PATENT DOCUMENTS

| 5,097,229 | A | | 3/1992 | Forge |
| 5,113,333 | A | * | 5/1992 | Ou .................................. 363/25 |
| 5,644,481 | A | * | 7/1997 | Konishi et al. ............. 363/21.15 |
| 5,946,202 | A | * | 8/1999 | Balogh ........................... 363/26 |
| 6,023,155 | A | | 2/2000 | Kalinsky et al. |
| 6,074,783 | A | * | 6/2000 | Gaydos et al. ............. 429/218.2 |
| 6,807,076 | B1 | * | 10/2004 | York .............................. 363/124 |
| 2005/0122746 | A1 | * | 6/2005 | Nagel et al. ...................... 363/15 |
| 2008/0238375 | A1 | * | 10/2008 | Chen et al. ..................... 323/234 |
| 2009/0168462 | A1 | * | 7/2009 | Schopfer et al. ........... 363/21.01 |
| 2009/0172421 | A1 | | 7/2009 | Schindler |
| 2010/0165670 | A1 | * | 7/2010 | Piazzesi ..................... 363/21.12 |
| 2011/0080042 | A1 | * | 4/2011 | Kumar ........................... 307/9.1 |

FOREIGN PATENT DOCUMENTS

| CN | 101106333 A | 1/2008 |
| CN | 101783604 A | 7/2010 |
| JP | 62-066707 A | 3/1987 |

* cited by examiner

*Primary Examiner* — Adolf Berhane
*Assistant Examiner* — Gary Nash
(74) *Attorney, Agent, or Firm* — Roberts Mlotkowski Safran & Cole, PC; David S. Safran

(57) ABSTRACT

A converter with at least one or more transformers having at least one primary side magnetically coupled to at least one secondary side, the primary side being electrically isolated from the secondary side, wherein a first transformer has first and second sets of coils and a second transformer has third and fourth sets of coils. The first set of coils is connected in series to the third set of coils, wherein one of the secondary sides is connectable to an external output unit, wherein another secondary side is connectable to an external input source, wherein the two secondary sides are electrically isolated from each other, wherein the primary side is adapted to drive the transformers that are connectable to an external power source. The converter uses a shared current path and an isolated current-to-current transfer between the input and output sides to replicate the input current to an output current.

11 Claims, 4 Drawing Sheets

CONVERTER WITH SHARED CURRENT PATH AND ISOLATION BARRIER

BACKGROUND OF THE INVENTION

1. Field of the Invention

The present invention relates to a converter comprising at least one or more transformers having at least one primary side magnetically coupled to at least one secondary side, wherein the primary side is electrically isolated from the secondary side by an isolation barrier, wherein a first transformer comprises a first set of coils and a second set of coils and a second transformer comprises a third set of coils and a fourth set of coils where the first set of coils is connected in series to the third set of coils, wherein one of the secondary sides is configured to be connected to an external output unit.

2. Description of Related Art

It is well known within signal or power transformer systems to use an isolation barrier in a magnetic (or inductive) coupling to electronically isolate the primary side from the secondary side for protecting the circuitry on the secondary side and eliminating common-mode noise.

U.S. Pat. No. 5,097,229 discloses an analog direct current to 1 MHz information channel, with high accuracy and 10K volt input-output isolation. The information channel has a voltage-to-current converter, which receives the analogue input signal and whose output is modulated by a square wave generator and provided to a center tap of the primary winding of a transformer. On the output side, the secondary winding of the transformer provides the signal to a precision rectifier which recovers the analogue input signal. This configuration does not disclose an isolation barrier between the input and the output on the secondary side, thereby making the circuitry susceptible to potentially damaging external impacts. This configuration does not comprise measuring means or regulating means capable of adjusting the power to the transformers according to the load resistance of the output side.

SUMMARY OF THE INVENTION

It is an object of the invention to provide a converter capable of replicating an input current with high precision.

It is an object of the invention to provide a converter transferring energy from a primary unit to two secondary units using two transformers having a shared current path.

It is an object of the invention to provide a converter capable of compensating for a load impedance at the output side.

It is an object of the invention to provide a converter capable of maintaining a regulated supply of energy to the input transformer.

As mentioned above, the invention relates to a converter characterized in that another secondary side is configured to be connected to an external input source, wherein the two secondary sides are electrically isolated from each other by a second isolation barrier, wherein the primary side comprises means configured to drive the transformers which is configured to be connected to an external power source. This provides a converter particularly suited for current-to-current transformation where the output side is electronically isolated from the input side. This provides an isolated current-to-current transfer between the secondary input side and the secondary output side where the input current is replicated to an output current with high accuracy. This configuration enables the input current to be transferred to the primary side and then transferred to the output side, since the same current flows through the two transformers.

According to one embodiment of the invention, the second set of coils is connected to a first rectifying circuit. This enables the energy transferred from the primary side to the output side to be rectified into an output current. The rectified output current may be smoothed using a smoothing circuit connected to the rectifying circuit so that the ripple of the output current is further reduced. Alternatively, a voltage regulating circuit or further filter means may be connected to the rectifying circuit, if a very low ripple is desired. The polarity of the first set of coils may be arranged relative to the second set of coils and/or the third set of coils so that they either have the same polarity or opposite polarities.

According to an embodiment of the invention, the fourth set of coils is connected to a second rectifying circuit. This enables the energy transferred from the primary side to the input side to be rectified into an input current. The rectified output current may be smoothed using a smoothing circuit connected to the rectifying circuit so that the ripple of the output current or voltage is further reduced.

Alternatively, a voltage regulating circuit or further filter means may be connected to the rectifying circuit, if a very low ripple is desired. The polarity of the fourth set of coils may be arranged relative to the second set of coils and/or third set of coils so that they either have the same polarity or opposite polarities. This enables the sets of coils in the two transformers to be arranged relative to each other depending on the desired configuration of the converter. In one embodiment, the sets of coils on the primary side have opposite polarities of the sets of coils on the secondary sides.

According to an embodiment of the invention, the first set of coils is connected to a switch mode circuit, which is configured to drive the primary side and is configured to be connected to the external power source. This enables the switch mode circuit to drive the first set of coils and the third set of coils based on the power applied by the power source using a switch mode signal. The switch mode signal may be filtered using filter means, such as a capacitor, so that only an AC-signal is transmitted to the first transformer.

According to an embodiment of the invention, at least one measuring circuit is arranged at the primary side and is configured to measure the energy through at least one of the two interconnected sets of coils, wherein the measuring circuit is connected to a power conversion unit, which is configured to be connected to the external power source and is configured to drive the switch mode circuit based on the measured signal from the measuring circuit. This enables the energy transferred to at least one of the secondary sides to be measured using the measuring circuit. The power conversion unit then uses this measured signal to control the power applied to the switch mode circuit.

By measuring the amount of energy through the second transformer acting as the input transformer, it is possible to compensate for an unknown load impedance which otherwise would lead to the introduction of unwanted effects on the input side, such as fluctuation of the input voltage level due to variations in the load resistance or component specific non-linearity between the input side and the output side due to phase/frequency shifting or fluctuation or other variations in the load impedance. The signal from the measuring circuit may be demodulated or digitalized, e.g., by an AD-converter, before being transmitted to the power conversion unit, if needed.

According to a specific embodiment of the invention, the measuring circuit is configured to measure the voltage over the third set of coils and is connected to a regulation unit, which is configured to at least control the operation of the power conversion unit. This enables the voltage level applied to the input transformer to be measured and used to regulate at least the power applied from the power conversion unit to the switch mode circuit. This enables the regulation unit to maintain a constant voltage level over the input transformer, thereby compensating for errors and losses in the transformers. In a simple embodiment, the measuring circuit may be a high impedance load connected in parallel with the third set of coils.

According to a specific embodiment of the invention, the measuring circuit is configured to measure the current passing through the third set of coils and is connected to a regulation unit, which is configured to at least control the current passing through the first transformer. This enables the current passing through the input transformer to be measured and used to control the current passing through the output transformer. This measurement could preferably be combined with the voltage measurement over the input transformer so that the measuring units are able to detect variations in the load impedance and not just the load resistance. This enables the regulation unit to more accurately regulate the voltage level over the input transformer. The measuring circuit may comprise means for detecting any variations in the voltage level in the time and/or frequency domain.

According to a specific embodiment of the invention, the regulation unit is a processor unit, which in turns is connected to the power conversion unit and the switch mode circuit, where the processor unit is configured to control the operation of the switch mode circuit and the power conversion unit. This enables the processor unit to manage the regulation of energy applied to the input transformer and the output transformer and thus the energy transfer from the primary side to the two secondary sides. The regulation may be performed automatically according to one or more reference parameters stored in the processor unit. In one embodiment, one or more of the reference parameters may be adjusted using a user interface connected to the processor unit. This allows the processor unit to synchronize the demodulation (sampling) of the measured signals with the control of the switch mode circuit. By using a successive approximation routine (SAR) AD-converter the measured signals may be demodulated with the same margin of error. The SAR AD-converter is preferred when the measured signals have a frequency higher than the sampling rate capacity of the AD-converter, since the sample rate of the SAR AD-converter is limited by the conversion rate rather than the actual sampling time. The processor unit then processes the sampled signals using an algorithm implemented in the processor unit before transmitting a control signal to the power conversion unit, e.g., via a DA-converter. In a preferred embodiment, the sampled signals are processed using a signal processing algorithm configured to compensate for various errors, losses, tolerances or other non-linearities in the transformers, thereby allowing the converter to more accurately replicate the input current on the output side.

According to another specific embodiment of the invention, a switch is connected to the interconnecting path between the first set of coils and the third set of coils and is further connected to the processor unit, where the processor unit is configured to control the operation of the switch. This enables the processor unit to demodulate the voltage signal using a switch where the control of the switch is synchronized with the operation of the switch mode circuit. The operation of the switch mode circuit and/or the power conversion mode may be controlled according to a control algorithm implemented in the processor unit.

According to a further specific embodiment of the invention, a first offset current generator is connected to the first rectifying circuit and a second offset current generator is connected to the regulation unit and the first set of coils, wherein the first offset current generator is configured to generate a static offset current and the second offset current generator is configured to generate an adjustable offset current, wherein the regulation unit is configured to control the operation of the second offset current generator. This enables the converter to control the effect of non-linearities between the input current and the output current due to differences in the input transformer and the output transformer by adding a static offset current to the output current and an adjustable offset current to the primary side, thereby allowing the converter to more accurately replicate the input current on the output side. The static offset current is used to bias the output current (and the transfer error) so that the current adjustment (linearization) is performed unipolar. The adjustable offset current is arranged so that it has an opposite effect on the static offset added to the output current. This enables the regulation unit to adjust the offset current dynamically according to control logics or an algorithm, e.g., the signal processing algorithm, implemented in the regulation unit.

According to a specific embodiment of the invention, the regulation unit comprises a linearization function configured to compensate for a transfer error between the input side and the output side at a given input signal. This enables the processor unit to adjust the current-to-current conversion so that the conversion scheme follows a linearized function. The processor unit may alternatively use a different non-linearization function to compensate for any transfer error between the input side and the output side. The linearization function may be configured to a multi-dimensional function capable of compensating for a transfer error at a given input current or which impedance the input current passes.

In a preferred embodiment, the linearization function is implemented as a complete look-up table or a compressed look-up table using an interpolation method/function to represent any value between at least two table values. This enables the linearization function to be implemented during manufacture and/or updated during the lifetime of the converter, if needed.

An embodiment of the invention will now be described, by way of example only, with reference to the accompanying drawings.

DETAILED DESCRIPTION OF THE INVENTION

In the following text, the figures will be described one by one and the different parts and positions seen in the figures will be numbered with the same numbers in the different figures. Not all parts and positions indicated in a specific figure will necessarily be discussed together with that figure.

Figure 1:
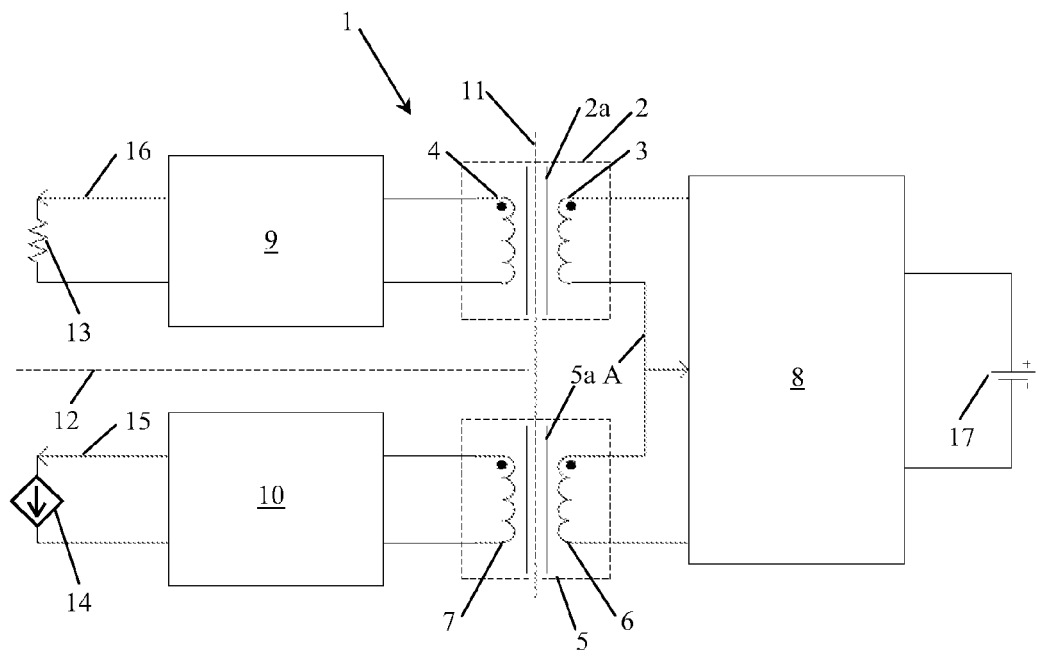
FIG. 1 shows a configuration of the converter according to the invention.

FIG. 1 shows one exemplary configuration of the converter 1 according to the invention. The converter 1 comprises at least two transformers having at least one primary side magnetically coupled to at least one secondary side. A first transformer 2 acting as an output transformer may comprise a first set of coils 3 and a second set of coils 4, wherein the two sets of coils 3, 4 may be arranged in and/or around a magnetic core 2a in at least one predetermined pattern. A second transformer 5 acting as an input transformer may comprise a third set of coils 6 and a fourth set of coils 7, wherein the two sets of coils 6, 7 may be arranged in and/or around a magnetic core 5a in at least one predetermined pattern. The magnetic cores 2a, 5a of the transformers may be made of an electromagnetic material. The first set of coils 3 is connected in series to the third set of coils 6 via a shared current path A, thereby forming a single combined primary side 8. The primary side 8 may be electronically isolated from the secondary sides 9, 10 of the transformers 2, 5 by at least one isolation barrier 11. The secondary side 9 of the first transformer 2 may be electronically isolated from the secondary side 10 of the second transformer 5 by at least one isolation barrier 12. The isolation barriers 11, 12 may be separate isolation barriers or form parts of a common isolation barrier. The configuration and materials of the isolation barriers 11, 12 may determined according to the desired use and placement of the converter.

The converter 1 may be configured as a current-to-current converter which may be configured to transfer a DC input current to a DC output current. The DC-current may be superimposed with an AC-current. The secondary side 9 may be configured to be connected to an external output unit 13 in the form of a measurement resistance or impedance or another suitable load circuit or load unit. The other secondary side 10 may be configured to be connected to an external input energy source 14 in the form of a current source, a voltage source or another suitable energy source. The converter is in a preferred embodiment configured so that it provides an isolated current-to-current transformation between the input side 10 capable of being connected/coupled to a DC current source and a output side 9 capable of being connected/coupled to a load unit/circuit. This enables the input current 15 to be duplicated on the output side 9 in the form of an output current 16 generated using driving means arranged at the primary side 8 which is configured to be connected to an external power source 17.

Figure 2:
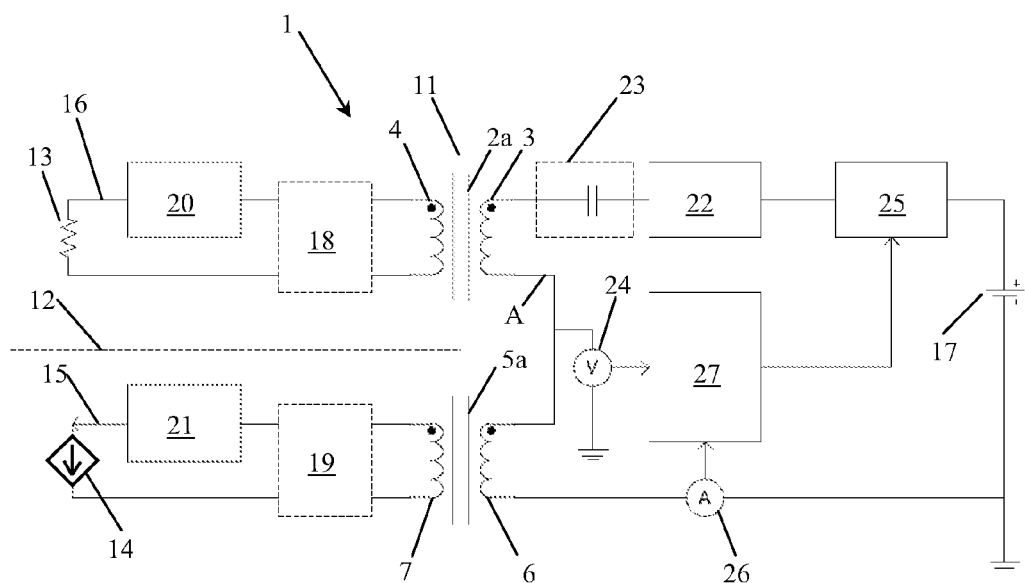
FIG. 2 shows a first exemplary embodiment of the configuration of the converter.

FIG. 2 shows a first exemplary embodiment of the configuration of the converter 1. The secondary side 9 may comprise a rectifying circuit 18 in the form a current rectifying circuit connected to the second set of coils 4. The rectifying circuit 18 may in one embodiment comprise an arrangement of rectifying diodes, capacitors and/or other suitable components. The first set of coils 3 may be arranged so that it has the same polarity as the second set of coils 4 or the third set of coils 6, as shown in FIG. 2.

The secondary side 10 may comprise a rectifying circuit 19 in the form a current rectifying circuit connected to the fourth set of coils 7. The rectifying circuit 19 may have the same configuration as the rectifying circuit 18. The fourth set of coils 7 may be arranged so that it has the same polarity as the third set of coils 6 or the second set of coils 4, as shown in FIG. 2. The sets of coils 3, 6 at the primary side 8 and the sets of coils 4, 7 at the secondary sides may have the same or opposite polarities. Alternatively, the sets of coils 3, 4 of the first transformer 2 and the sets of coils 6, 7 of the second transformer 5 may have the same or opposite polarities. This enables the rectifying circuits 18, 19 to rectify the AC-current transferred from the primary side 8 to a DC-current which may have a superimposed AC-current.

A signal processing circuit 20 may be arranged between the rectifying circuit 18 and the external output unit 13. The signal processing circuit 20 may comprise a smoothing circuit (not shown), filter means and/or other known components arranged so that they perform sufficient noise suppression, smoothening of the output signal 16 or other relevant functions. A second signal processing circuit 21 may be arranged between the rectifying circuit 19 and external input source 14. This signal processing circuit 21 may comprise a smoothing circuit (not shown), filter means and/or other known components arranged so that they perform sufficient noise suppression, smoothening of the input signal 15 or other relevant functions. The two signal processing circuits 20, 21 may have different or the same configuration which may be determined according to a predetermined set of specifications.

A switch mode circuit 22 may be arranged between one end of the first set of coils 3 and the external power source 17. The switch mode circuit 22 may be configured to drive the primary side 8. The output current 16 is set by the input current 15 and partly the magnitude of the externally applied power to the switch mode circuit 22. The switch mode circuit 22 may regulate the voltage over the input source 14 by adjusting the sampling magnitude of the applied voltage, the duty cycle or the frequency of the switch mode output signal. The switch mode output signal from the switch mode circuit 22 generates a current in the transformers 2, 5 so that the same current is passed through both transformers 2, 5 via the common current path.

Filter means 23 in the form of a capacitor or another AC-coupling may be arranged between the switch mode circuit 22 and the first set of coils 3 so that only AC-signals are transmitted to the first set of coils 3. The filter means 23 may be configured so that the current passing through the transformers 2, 5 is an AC-current and that any switching error, e.g., harmonics, due to the switch mode power generation is eliminated or at least reduced to a minimum.

A measuring circuit 24 may be connected to the common current path A, e.g., the interconnected ends of the first set of coils 3 and the third set of coils 6. The measuring circuit 24 may be configured to measure the voltage signal over at least one of the sets of coils 3, 6 and may transmit the measured signal to a power conversion unit 25. In a preferred embodiment, the measuring circuit 24 is configured to measure the voltage signal over the second transformer 2 and thus the third set of coils 6. In a simple embodiment, the measuring circuit 24 may be a high impedance load connected in parallel with the third set of coils 6.

A second measuring circuit 26 may be connected in series to the third set of coils and the power source 17. The second measuring circuit 26 may be configured to measure the current signal passing the through the second transformer 5 and thus the third set of coils 6 and may transmit the measured signal to the power conversion unit 25. In a preferred embodiment, both measuring circuits 24, 26 are arranged at the primary side 8 so that they measure the amount of energy through the second transformer 5. The measuring circuits 24, 26 may comprise means for detecting any variations in the voltage level in the time and/or frequency domain so that they are able to detect variations in the load impedance and not just the load resistance.

The power conversion unit 25 may be arranged between the power source 17 and the switch mode circuit 22. The power conversion unit 25 may be configured to drive the switch mode circuit 22 based on the measured signals from the measuring circuits 24, 26. The power source 17 may apply power to the power conversion unit 25.

A regulation unit 27 may be arranged between the measuring circuits 24, 26 and the power conversion unit 25. The regulation unit 27 may be configured to at least control the operation of the power conversion unit 25 based on the measured signals from the measuring circuits 24, 26. The regulation unit 27 may comprise means for analyzing the measured signals, e.g., comparing the measured signal to one or more reference parameters, and generating a control signal which is transmitted to the power conversion unit 25. This enables the regulation unit 27 to more accurately regulate the voltage level applied to the input transformer 5. The regulation unit 27 may be configured to regulate the amount of energy applied to the input transformer 5 via the switch mode circuit 22 so that the regulation unit 27 maintains a constant voltage level over the input transformer 5, thereby compensating for errors/losses in the transformers 2, 5 and an unknown load impedance of the output unit 13 which otherwise would lead to the introduction of unwanted effects on the input side 10, such as fluctuation of the input voltage level due to variations in the load resistance or component specific non-linearity between the input side 10 and the output side 9 due to phase/frequency shifting or fluctuation or other variations in the load impedance.

Figure 3:
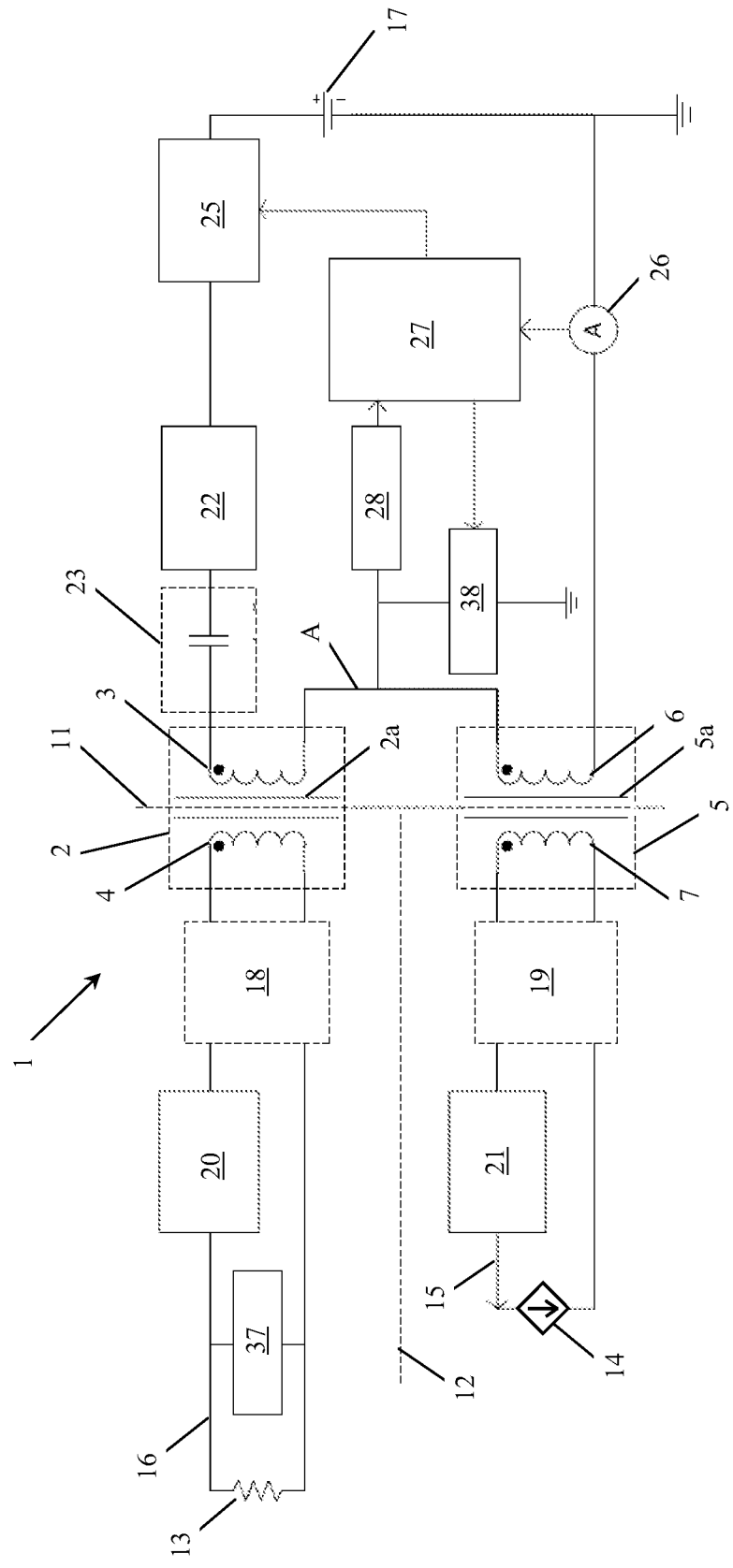
FIG. 3 shows a second embodiment of the configuration of the converter.

FIG. 3 shows a second embodiment of the configuration of the converter 1. In this embodiment, a demodulation circuit 28 in the form of an AD-converter may be arranged between the common current path A and the regulation unit 27. The demodulation circuit 28 may be configured to demodulate and/or sample the voltage signal over the input transformer 5 before transmitting the measured signal to the regulation unit 27. A second demodulation unit (not shown) in the form of an AD-converter may be arranged between the measuring unit 26 and the regulation unit 27 and may be configured to demodulate and/or sample the current signal through the input transformer 5.

Figure 4:
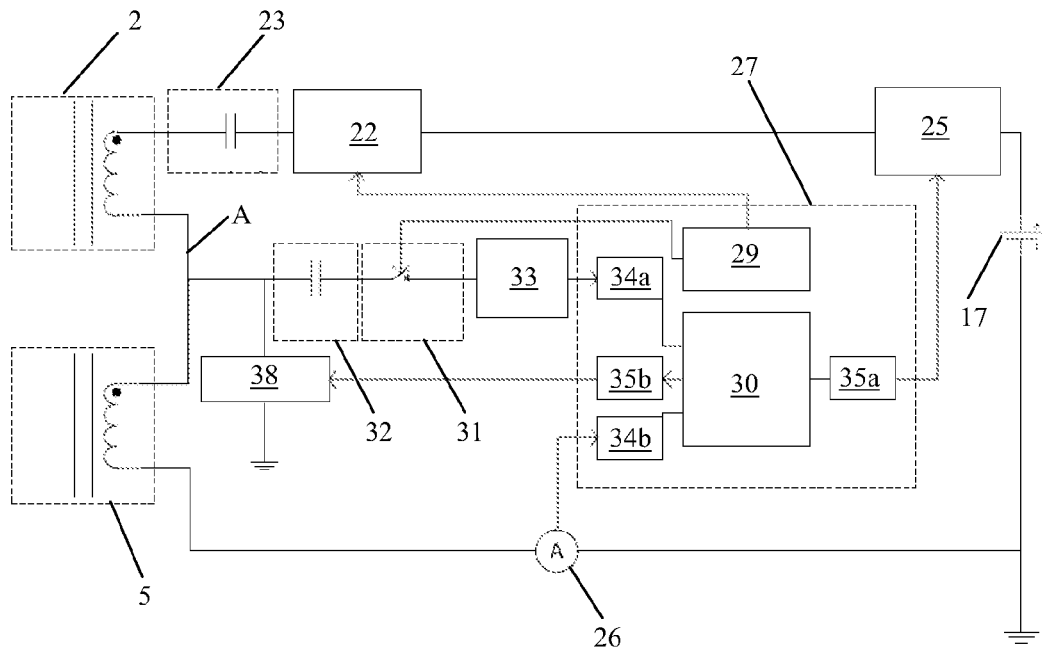
FIG. 4 shows a third embodiment of the configuration of the primary side.

FIG. 4 shows a third embodiment of the configuration of the primary side. In this embodiment, the regulation unit 27 is a processor unit configured to digitally process the measured signals from the measuring circuits 24, 26. The processor unit 27 may be connected to the switch mode circuit 22, the power conversion unit 25 and the measuring circuits 24, 26. The processor unit 27 may be configured to control the operation of the switch mode circuit 22 via control logics or a control algorithm 29 implemented in the processor unit 27.

The measuring circuits 24, 26 may be connected to signal processing logics or a signal processing algorithm 30 implemented in the processor unit 27. The signal processing algorithm 30 may be configured to manage the operation of the power conversion unit 25 based on the measured signals. This management may be performed automatically according to one or more reference parameters stored in the processor unit 27 wherein one or more of the reference parameters may be adjusted using a user interface (not shown) connected to the processor unit 27. This enables the signal processing algorithm to compensate for various errors, losses, tolerances or other non-linearities in the transformers, thereby allowing the converter to more accurately replicate the input current 15 as an output current 16 on the output side 9.

In this embodiment, a switch 31 may be arranged between the common current path A and the processor unit 27. The operation of the switch 31 may be controlled by the processor unit 27 using either the same control means 29 which controls the operation of the switch mode circuit 22 or separate control means (not shown) in the form of control logics or an control algorithm implemented in the processor unit 27. The control means 29 may transmit a control signal to the switch 31 which may be synchronized with the control signal transmitted to the switch mode circuit 22. In this embodiment, the switch 31 may act as a part of the measuring circuit 24.

Filter means 32 in the form of a capacitor or another AC-coupling may be arranged between the switch 31 and the common current path A so that only AC-signals are transmitted to the switch 31.

A signal processing circuit 33 may be arranged between the switch 31 and the processor unit 27. The signal processing circuit 33 may comprise a filter means (not shown) and/or other known components arranged so that they perform sufficient noise suppression or other relevant functions of the switched signal according to a predetermined specification.

A demodulation circuit 34a in the form of an AD-converter may be arranged between the signal processing circuit 33 and the processor unit 27. The switched signal from the switch 31 may be demodulated according to the control signal transmitted to the switch mode circuit 22. In one embodiment, an AD-converter using a successive approximation routine (SAR) to sample the switched signal may be arranged between the processor itself and switch 31. If needed, a DA-converter 35a may be arranged between the processor itself and the power conversion unit 25 and may modulate the control signal transmitted to the power conversion unit 25. The configuration of the SAR AD-converter 34a may be determined according the waveform characteristics of the measured signal. A second demodulation circuit 34b may be arranged between the measuring circuit 26 and the processor unit 27. This demodulation circuit may be also be a SAR AD-converter.

Figure 5:
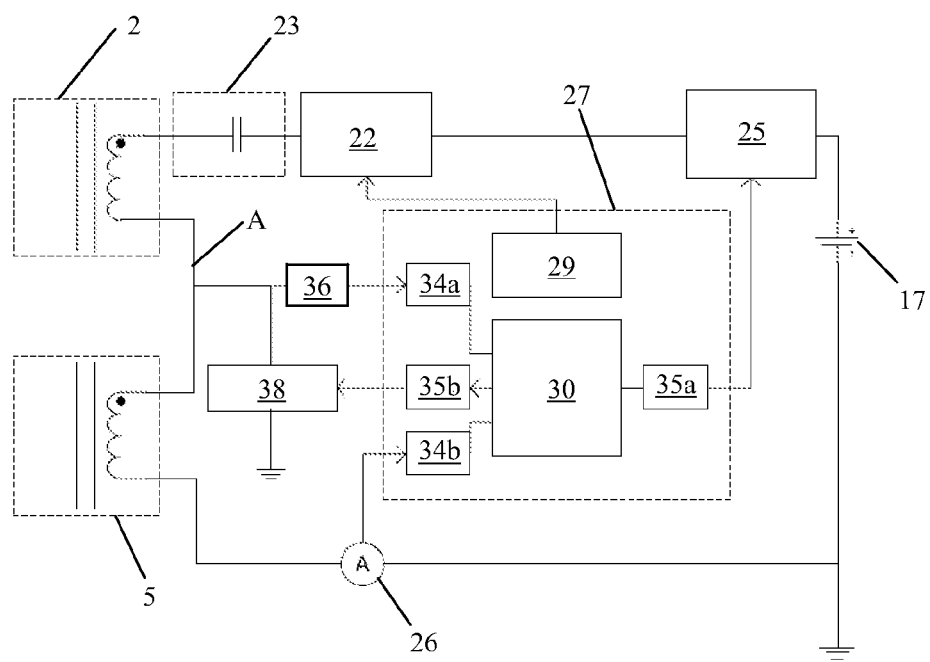
FIG. 5 shows a fourth embodiment of the configuration of the primary side.

FIG. 5 shows a fourth embodiment of the configuration of the primary side. In this embodiment, the switch 31, the filter means 32 and the signal processing circuit 33 is omitted. The control algorithm 29 may be configured to control the operation of the switch mode circuit 22. The demodulation of the measured signals 24, 26 may be synchronized according to the control signal transmitted to the switch mode circuit 22.

A signal processing circuit 36 may be arranged between the processor unit 27 and the common current path A. The signal processing circuit 36 may comprise a filter means (not shown) and/or other known components arranged so that they perform sufficient noise suppression or other relevant functions of the switched signal according to a predetermined specification. The signal processing circuit 36 may comprise a capacitor or another AC-coupling may be arranged between the processor unit 27 and the common current path A so that only AC-signals are transmitted to the processor unit 27.

In one embodiment, the number of components used in the switch mode circuit 22, the power conversion unit 25 and the processor unit 27 may be reduced by implementing the control components/intelligence configured to collect, process and analyze a number of signals in the system, e.g., the measured signals, in a single processor unit. The single processor unit performs the all the control functions/operations of the system and generates the control signals used to control/activate the controlled components in the switch mode circuit 22, the power conversion unit 25 and the processor unit 27. The implementation of the switch mode circuit 22, the power conversion unit 25 and the processor unit 27 may be done by any known implementation topology, such as the SEPIC-topology. This enables the data processing to be preformed synchronized which would reduce the noise generated in the system, e.g., the regulation of the energy applied to the two transformers 2, 5. This would also lower the manufacturing cost of the system.

In the embodiments shown in FIGS. 3-5, a first offset current generator 37 may be arranged between the first rectifying circuit 18 and the output unit 13. The first offset current generator 37 may be configured to generate a static offset current applied to the output current 16. A second offset current generator 38 may be arranged between the regulation unit 27 and the first set of coils 3 or the measuring circuit 24. The second offset current generator 38 may be configured to generate an adjustable offset current applied to the current passing through the output transformer 2 and thus the first set of coils 3. The second offset generator 38 may be configured so that the offset current applied at the primary side 8 has an opposite effect on the static offset current applied at the secondary output side 9. The regulation unit 27 may be configured to control the operation of the second offset current generator 38. The operation of the second current generator 38 may be managed by the signal processing algorithm 30 in the processor unit 27 based on the measured signal from the measuring circuit 26. If needed, a DA-converter 35b may be arranged between the processor itself and the second offset current generator 38 and may modulate the control signal transmitted to the second offset current generator 38. This reduces the error of non-linearities between the input current and the output current due to differences in the two transformers which may be preformed dynamically by the processor unit 27.

The processor unit 27 shown in FIGS. 4 & 5 may comprise a linearization function configured to compensate for a transfer error (incl. other errors, tolerances or nonlinearities) relating to the two transformers and/or other components between the input side 10 and the output side 9. The linearization function may be used to adjust the offset current value of the second offset generator 38 based on the measured signals, e.g., the measured current signal. The linearization function may be configured to as a multi-dimensional function capable of compensating for a transfer error at a given input current or which impedance the input current 15 passes. In a preferred embodiment, the linearization function is implemented as a complete look-up table or a compressed look-up table using an interpolation method/function to represent any value between at least two table values. The linearization function may be updated or uploaded via the user interface connected to the processor unit 27.

Figure 6:
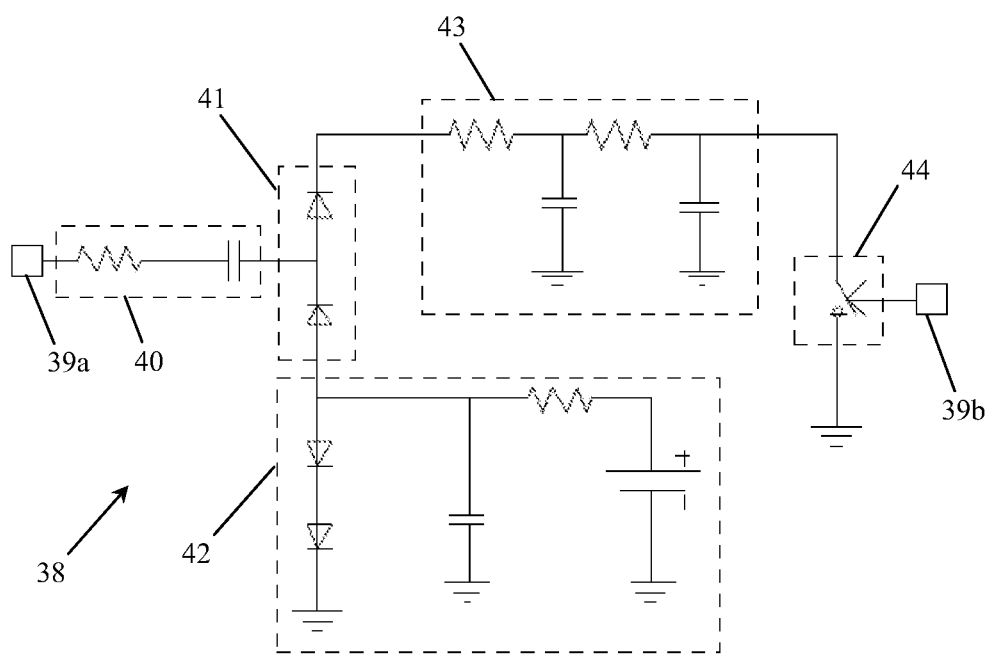
FIG. 6 shows an exemplary embodiment of the second offset current generator.

FIG. 6 shows an exemplary embodiment of the second offset current generator 38. The measuring circuit 24 or the common current path A may be connected to filter means 40 via a first end 39a. The filter means 40 may comprise a capacitor or another AC-coupling so that only AC-signals are transmitted to the first set of coils 3, A rectifying circuit 41 in the form of a diode arrangement may be arranged between the filter means 40, a voltage source unit 42 and a signal processing circuit 43, as shown in FIG. 6. The rectifying circuit 41 may be configured to lead the current from the filter means 40 to the signal processing circuit 43.

The voltage source unit 42 may be configured to be connected to a power source in the form of an intern or external power source. The voltage source unit 42 may comprise a voltage reference circuit in the form of a second diode arrangement connected to the rectifying circuit 41 and the power source. The second diode arrangement may be arranged with a current direction opposite of the rectifying circuit 41 so that the temperature drift of the voltage reference circuit counteracts the temperature drift of the rectifying circuit 41.

The voltage source unit 42 may comprise filter means and/or other known components arranged between the rectifying circuits and the power source. The filter means and/or the other components may be arranged so that they perform sufficient noise suppression or other relevant functions of the power applied from the power source.

The signal processing circuit 43 may be arranged between the rectifying circuit 41 and a switch 44. The signal processing circuit 43 may comprise filter means and/or other known components arranged so that they perform sufficient noise suppression or other relevant functions of the signal according to a predetermined specification.

The switch 44 in the form of a transistor which may be controlled by the regulation unit 27 via control signals transmitted through a second end 39b connected to the regulation unit 27. The switch 44 may be configured to control the current applied from the filter means 40.

The invention is not limited to the embodiments described herein, and may be modified or adapted without departing from the scope of the present invention as described in the patent claims below.

What is claimed is:

1. A converter (1) comprising at least one or more transformers (2, 5) having at least one primary side (8) magnetically coupled to at least one first secondary side (10), wherein the primary side (8) is electrically isolated from the first secondary side (10) by an isolation barrier (11), wherein a first transformer (2) comprises a first set of coils (3) and a second set of coils (4) and a second transformer (5) comprises a third set of coils (6) and a fourth set of coils (7) where the first set of coils (3) is connected in series to the third set of coils (6), wherein a second secondary side (9) is configured to be connected to an external output unit (13) wherein that the first secondary side (10) is configured to be connected to an external input source (14), wherein the first and second secondary sides (9, 10) are electrically isolated from each other by a second isolation barrier (12), wherein the primary side (8) comprises means configured to drive the transformers (2, 5) which is configured to be connected to an external power source (17) whereby an isolated current-to-current transformation is able to be produced between the external input source (14) that is capable of being connected/coupled to the the another secondary side (10) and the one (9) of the secondary sides that is capable of being connected/coupled to the external output unit (13), thereby enabling an input current (15) to be duplicated on an output side in the form of an output current (16) which is configured to be connected to the external output unit (13), whereby an isolated current-to-current transformation is able to be produced between the external input source that is capable of being connected/coupled to the external input unit and the external output unit that is capable of being connected/coupled to a load unit/circuit, thereby enabling an input current to be duplicated on an output side in the form of an output current which is configured to be connected to an external power source.

2. A converter according to claim 1, wherein the second set of coils (4) is connected to a first rectifying circuit (18).

3. A converter according to claim 1, wherein the fourth set of coils (7) is connected to a second rectifying circuit (19).

4. A converter according to claim 1, wherein the first set of coils (3) is connected to a switch mode circuit (22), which is configured to drive the primary side (8) and is configured to be connected to the external power source (17).

5. A converter (1) comprising at least one or more transformers (2, 5) having at least one primary side (8) magnetically coupled to at least one secondary side (10), wherein the primary side (8) is electrically isolated from the secondary side (10) by an isolation barrier (11), wherein a first transformer (2) comprises a first set of coils (3) and a second set of coils (4) and a second transformer (5) comprises a third set of coils (6) and a fourth set of coils (7) where the first set of coils (3) is connected in series to the third set of coils (6), wherein one (9) of the secondary sides is configured to be connected to an external output unit (13) wherein that another secondary side (10) is configured to be connected to an external input source (14), wherein the two secondary sides (9, 10) are electrically isolated from each other by a second isolation barrier (12), wherein the primary side (8) comprises means configured to drive the transformers (2, 5) which is configured to be connected to an external power source (17), wherein the first set of coils (3) is connected to a switch mode circuit (22), which is configured to drive the primary side (8) and is configured to be connected to the external power source (17), wherein at least one measuring circuit (24, 26) is arranged at primary side (8) and is configured to measure the energy through at least one of the two interconnected sets of coils (3, 6), wherein the measuring circuit (24, 26) is at least connected to a power conversion unit (25), which is configured to be connected to the external power source (17) and is configured to drive the switch mode circuit (22) based on the measured signal from the measuring circuit (24, 26).

6. A converter according to claim 5, wherein the measuring circuit (24) is configured to measure the voltage over the third set of coils (6) and is connected to a regulation unit (27), which is configured to at least control the operation of the power conversion unit (25).

7. A converter according to claim 5, wherein the measuring circuit (26) is configured to measure the current passing through the third set of coils (6) and is connected to a regulation unit (27), which is configured to at least control the current passing through the first transformer (2).

8. A converter according to claim 5, wherein the regulation unit (27) is a processor unit, which in turns is connected to the power conversion unit (25) and the switch mode circuit (22), where the processor unit (27) is configured to control the operation of the switch mode circuit (22) and the power conversion unit (25).

9. A converter according to claim 8, wherein a switch (31) is connected to the interconnecting path (A) between the first set of coils (3) and the third set of coils (6) and is further connected to the processor unit (27), where the processor unit (27) is configured to control the operation of the switch (31).

10. A converter according to claim 5, wherein a first offset current generator (37) is connected to the first rectifying circuit (18) and a second offset current generator (38) is connected to the regulation unit (27) and the first set of coils (3), wherein the first offset current generator (37) is configured to generate a static offset current and the second offset current generator (38) is configured to generate an adjustable offset current, wherein the regulation unit (27) is configured to control the operation of the second offset current generator (38).

11. A converter according to claim 10, wherein the regulation unit (27) comprises a linearization function configured to compensate for a transfer error between the input side and the output side at a given input signal.

* * * * *